US011022499B2

(12) United States Patent
Ohashi

(10) Patent No.: US 11,022,499 B2
(45) Date of Patent: Jun. 1, 2021

(54) TEMPERATURE DETECTION DEVICE AND POWER CONVERSION DEVICE

(71) Applicant: FUJI ELECTRIC CO., LTD., Kawasaki (JP)

(72) Inventor: Hidetomo Ohashi, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 175 days.

(21) Appl. No.: 16/370,012

(22) Filed: Mar. 29, 2019

(65) Prior Publication Data
US 2019/0226919 A1 Jul. 25, 2019

Related U.S. Application Data

(63) Continuation of application No. PCT/JP2018/009982, filed on Mar. 14, 2018.

(30) Foreign Application Priority Data

Apr. 13, 2017 (JP) .............................. JP2017-080131

(51) Int. Cl.
G01K 1/14 (2021.01)
G01K 13/00 (2021.01)
G01K 7/00 (2006.01)
G01K 7/01 (2006.01)
G01K 7/25 (2006.01)

(52) U.S. Cl.
CPC ........... G01K 7/01 (2013.01); G01K 7/25 (2013.01)

(58) Field of Classification Search
USPC ......... 374/152, 178, 170, 208, 183; 327/512
See application file for complete search history.

(56) References Cited

U.S. PATENT DOCUMENTS

| 8,217,708 | B2* | 7/2012 | Yoshikawa | G01K 7/01 327/513 |
| 8,475,038 | B2* | 7/2013 | Kim | G01K 7/01 374/170 |
| 2002/0003484 | A1 | 1/2002 | Oguro et al. | |
| 2010/0124251 | A1* | 5/2010 | Peterson | G01K 7/01 374/171 |
| 2012/0249654 | A1 | 10/2012 | Yamashita | |
| 2012/0250385 | A1* | 10/2012 | Takihara | H02M 1/32 363/132 |

(Continued)

FOREIGN PATENT DOCUMENTS

| JP | 3-137528 | 6/1991 |
| JP | 4-181130 | 6/1992 |

(Continued)

OTHER PUBLICATIONS

International Search Report dated Jun. 19, 2018 in corresponding International Application No. PCT/JP2018/009982.

(Continued)

Primary Examiner — Mirellys Jagan

(57) ABSTRACT

A temperature detection device which receives a temperature signal from a temperature sensor and outputs an electrical signal corresponding to the temperature signal. A temperature slope which is an amount of change in an output of the electric signal relative to an amount of change in the temperature signal is changed at a predetermined temperature threshold.

19 Claims, 8 Drawing Sheets

(56) References Cited

U.S. PATENT DOCUMENTS

| | | | | |
|---|---|---|---|---|
| 2014/0112372 A1* | 4/2014 | Hoene | ............... | G01K 7/01 |
| | | | | 374/178 |
| 2015/0364524 A1* | 12/2015 | Kadow | ............ | G01K 1/026 |
| | | | | 327/512 |
| 2018/0175610 A1* | 6/2018 | Mayell | ............. | G01K 3/005 |
| 2019/0296730 A1* | 9/2019 | Ogura | ............. | H02M 3/08 |

FOREIGN PATENT DOCUMENTS

| | | |
|---|---|---|
| JP | 2002-22542 | 1/2002 |
| JP | 2011-27625 | 2/2011 |
| JP | 2012-208051 | 10/2012 |
| JP | 2015-114106 | 6/2015 |

OTHER PUBLICATIONS

Written Opinion of the International Searching Authority dated Jun. 19, 2018, in corresponding International Application No. PCT/JP2018/009982 with English translation (13 pages including English translation).

\* cited by examiner

OUTPUT (Vout)

JUNCTION TEMPERATURE (Tj)

TEMPERATURE DETECTION DEVICE AND POWER CONVERSION DEVICE

CROSS-REFERENCE TO RELATED APPLICATIONS

This application is a Continuation of PCT Application No. PCT/JP2018/009982 filed Mar. 14, 2018, which claims the benefit of Japanese Patent Application No. 2017-080131 filed Apr. 13, 2017. The disclosures of the prior applications are hereby incorporated by reference herein in their entireties.

TECHNICAL FIELD

The present invention relates to a temperature detection device and a power conversion device provided with the same, and more particularly, to a temperature detection device for directly or indirectly detecting the operation junction temperature of a power semiconductor switching element which is used for power conversion, and a power conversion device provided with the same.

BACKGROUND ART

There has been known a technology for making it possible to change the amount of change in output voltage relative to the amount of change in temperature, according to a detected object and the purpose thereof (see JP-A-2012-208051 for instance).

This type of temperature detection is important in power conversion devices using power semiconductor switching elements. FIG. 9 shows an example of a circuit configuration for performing that type of temperature detection. A temperature detection device shown in FIG. 9 is particularly a device for detecting the operation junction temperature of a power semiconductor switching element which is used for power conversion. As shown in FIG. 9, the temperature detection device includes a constant-voltage power supply Vcc, a constant-current source Id connected to the constant-voltage power supply Vcc, a diode D which is connected in series to the constant-current source Id and acts as a temperature sensor, and an operational amplifier Amp which has a non-inverting input terminal connected to a reference voltage source Vref, and an inverting input terminal connected to the diode D via a resistor Ra and forming a closed loop via, a resistor Rb.

In this temperature detection device, a voltage signal Vf from the diode D is a signal representing the temperature (operation junction temperature) of a power semiconductor switching element, has a negative temperature coefficient, and is input to the inverting input terminal of the operational amplifier Amp via the resistor Ra. The operational amplifier Amp inverts and amplifies the voltage signal Vf thereby obtaining an output voltage Vout, and inputs the output voltage Vout to a microcomputer or the like. The microcomputer or the like detects the temperature of the power semiconductor switching element. Here, when the resistance values of the resistors Ra and Rb and the voltage values of the reference voltage source Vref and the voltage signal Vf are represented by the same reference symbols Ra, Rb, Vref, and Vf, respectively, the output voltage Vout has a voltage value of Vout=Vref Rb/Ra×(Vref−Vf).

Since the output voltage Vout is the object of voltage detection of a digital IC such as the microcomputer, in general, in a range in which the detection temperature of the temperature sensor, i.e. the operation junction temperature Tj of the power semiconductor switching element is between −40° and 150°, the output voltage varies in a range between 0 V and 5 V or a range between 0 V and 3.3 V which is the power-supply voltage range of the digital IC. The output voltage Vout of the operational amplifier Amp generally varies in a linear manner with respect to the detected operation junction temperature Tj, as shown in FIG. 10. Therefore, in the case where the output voltage Vout is in the range between 0 V and 5 V and the output voltage Vout linearly varies in every temperature range, the amount of change in the output voltage Vout relative to the detection temperature becomes 26 mV/° C. On the basis of this amount of change, for example, in the case where the accuracy ΔVout of output voltage has been set to ±0.104 V, the accuracy ΔTj of detection temperature becomes ±4° C.

In general, in power conversion devices, temperature detection devices are used for protecting power semiconductor switching elements from overheating. For this reason, it is required to improve the accuracy of temperature detection, i.e. the accuracy of output voltage Vout in a high-temperature range in which the power semiconductor switching element operates at high temperature. With respect to improvement of the accuracy of the output voltage Vout, in the related art, trimming of the reference voltage source Vref or the like is performed; however, due to the linear characteristic as described above, there is a limit in improving the detection accuracy For this reason, a technology capable of achieving further improvement of detection accuracy is required.

SUMMARY

An aspect of the invention provides a temperature detection device capable of further improving the accuracy of detection of the temperature of an object, and a power conversion device provided with the same.

Another aspect of the invention provides a temperature detection device capable of more flexibly performing temperature detection, and a power conversion device provided with the same.

A temperature detection device which receives a temperature signal from a temperature sensor and outputs an electrical signal corresponding to the temperature signal. A temperature slope is an amount of change in an output of the electric signal relative to an amount of change in the temperature signal is changed at a predetermined temperature threshold.

Since this configuration is used, according to the temperature detection device of the present invention, it becomes possible to change the amount of change in the output signal, according to change in the temperature of an object. Since the amount of change (the temperature slope) is increased, as compared to the case where change is linear, the output signal which changes according to the temperature represents more accurate temperature. Therefore, the accuracy of temperature detection improves. Since the accuracy of temperature detection improves, it becomes possible to protect the object, for example, a power semiconductor switching element which is used for power conversion, from overheating, more accurately, as compared to the related art.

A power conversion device includes a power semiconductor switching element. The power semiconductor switching element is used for power conversion. And the above-described temperature detection device detects an operation junction temperature of the power semiconductor switching element.

Since the power conversion device includes the temperature detection device having improved temperature detection accuracy, it is possible to widen the temperature margin of the power conversion device during a high-temperature operation, and it becomes possible to improve the output capacity.

According to the present invention, it becomes possible to further improve the accuracy of detection of the temperature of an object. Also, it becomes possible to more flexibly perform temperature detection.

DETAILED DESCRIPTION OF EMBODIMENTS

Hereinafter, temperature detection devices according to embodiments of the present invention, and power conversion devices provided with them will be described in detail with reference to the accompanying drawings. Throughout the drawings, identical or similar components are denoted by the same reference symbols.

First Embodiment (Configuration)

Figure 1:
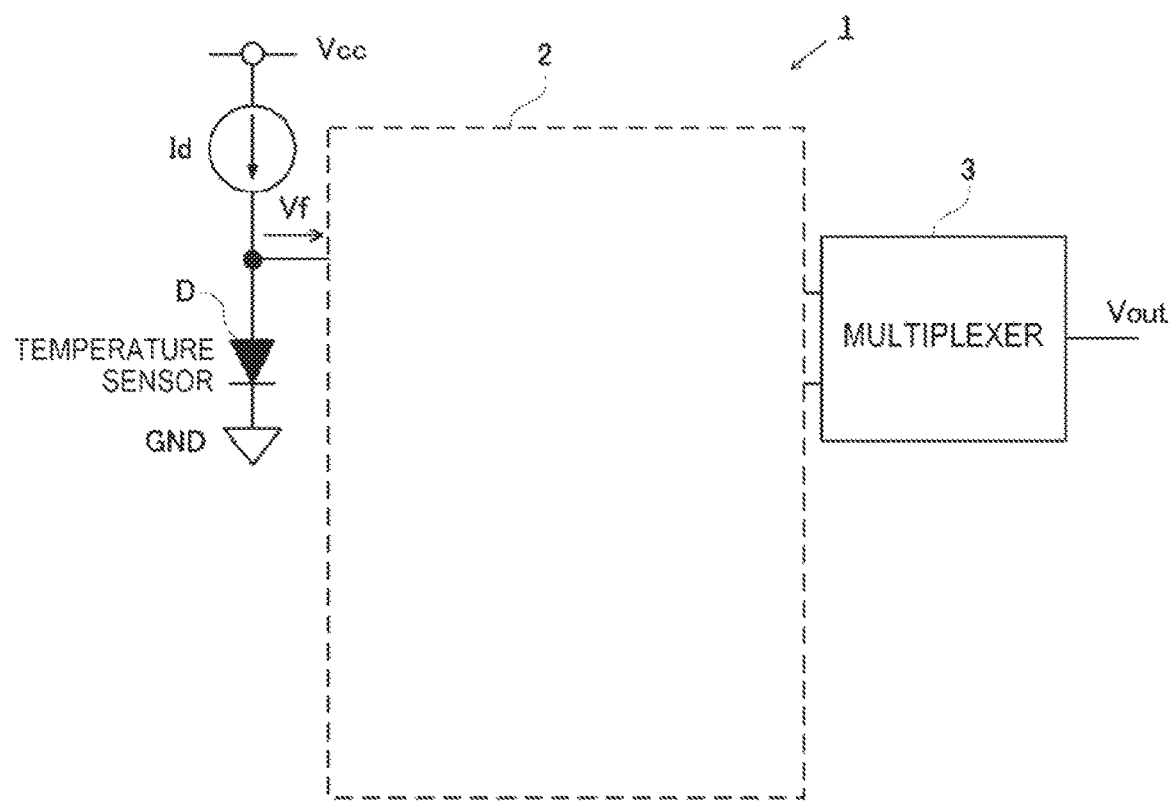
FIG. 1 is a circuit diagram illustrating an example of the configuration of a temperature detection device according to a first embodiment of the present invention.

As shown in FIG. 1, a temperature detection device 1 according to a first embodiment of the present invention is a device for detecting the temperature (operation junction temperature Tj) of a power semiconductor switching element which is used for power conversion, and includes, for example, a constant-voltage power supply Vec, a constant-current source Id connected to the constant-voltage power supply Vcc, a diode D which is connected in series to the constant-current source Id and acts as a temperature sensor, an output calculation unit 2 connected between the diode D and the constant-current source Id, and an output selection unit 3 to which the outputs of the output calculation unit 2 are input and which selectively outputs an output of the output calculation unit. A voltage signal Vout selectively output from the output selection unit 3 is input to, for example, a microcomputer or the like (not shown in the drawings), and the microcomputer or the like detects the temperature of the power semiconductor switching element on the basis of the received voltage signal Vout. The temperature detection device 1 of the present embodiment is a device which is formed in the chip of, for example, a discrete type second operation element (such as an IGBT) however, it may be a device which is formed outside the power semiconductor switching element, for example, in an IC for driving the power semiconductor switching element. But, even in that case, it is desirable that the temperature detection device should be disposed together with the power semiconductor switching element on the same heat dissipation board or in the same package. Also, the temperature detection device 1 may use, for example, a thermistor, instead of the diode D.

The constant-voltage power supply Vcc applies a predetermined voltage to the constant-current source Id. The constant-current source Id supplies a predetermined constant current to the diode D. For example, the anode side of the diode D is connected to the constant-current source Id and the output calculation unit 2, and the cathode side is grounded.

Figure 2:
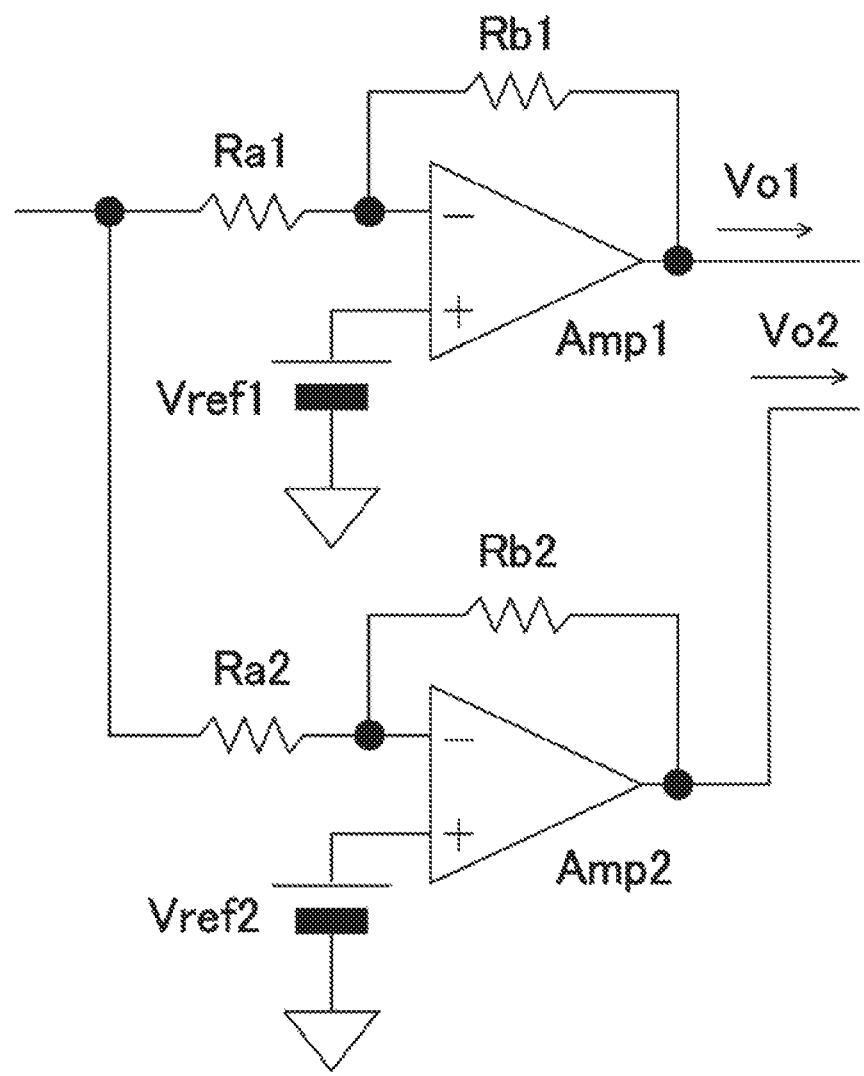
FIG. 2 is a view illustrating an example of the configuration of an output calculation unit of FIG. 1.

To the output calculation unit 2, as a voltage signal from the diode D, a voltage signal Vf having a voltage value according to the operation junction temperature Tj of the power semiconductor switching element is input. An example of the configuration of the output calculation unit 2 is shown in FIG. 2. As shown in FIG. 2, the output calculation unit 2 according to the present embodiment includes operational amplifiers Amp1 and Amp2.

More specifically, the non-inverting input terminal of the operational amplifier Amp1 is connected to a reference voltage source Vref1, and the inverting input terminal is connected to the diode D and the constant-current source Id via a resistor Ra1. Further, the output terminal and inverting input terminal of the operational amplifier Amp1 form a closed loop, i.e. a negative feedback circuit via a resistor Rb1. In this configuration, as described above, the voltage signal Vf Which is output from the diode D has a voltage value according to the operation junction temperature Tj of the power semiconductor switching element, and has a negative temperature coefficient. This voltage signal Vf is input to the operational amplifier Amp1, and is inverted and amplified. An output voltage Vo1 obtained by the inversion and the amplification is input to the output selection unit 3. The same is true for the operational amplifier Amp2, and an output voltage Vo1 obtained by inversion and amplification is input to the output selection unit 3. Also, the reference voltage source Vref1 and a reference voltage source Vref2 may have, for example, the same electric potential.

Figure 3:
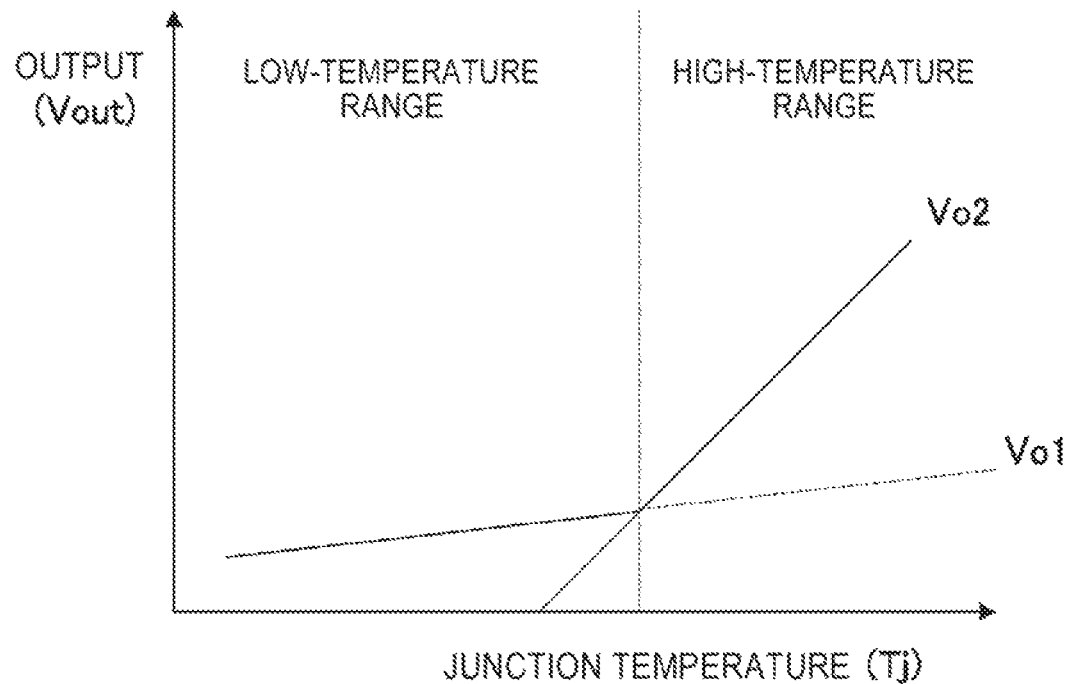
FIG. 3 is a graph illustrating the output characteristic of the temperature detection device shown in FIG. 1.

Here, when the resistance values of the individual resistors shown in FIG. 2, i.e. the resistors Ra1, Ra2, Rb1, and Rb2 are represented by the same reference symbols Ra1, Ra2, Rb1, and Rb2, the resistance values are set and selected such that the ratio Rb1/Ra1 of the resistance values of the resistors Rb1 and Ra1 disposed on the operational amplifier (Amp1) side and the ratio Rb2/Ra2 of the resistance values of the resistors Rb2 and Ra2 disposed on the operational amplifier (Amp2) side become different values. In this case, the output voltage Vo1 is expressed as Vo1=Vref1+Rb1/Ra1×(Vref1−Vf), and the output voltage Vo2 is expressed as Vo2=Vref2−Rb2/Ra2×(Vref2−Vf). Therefore, since the resistance value ratio Rb1/Ra1 and the resistance value ratio Rb2/Ra2 are set to different values, although the output voltage Vo1 of the operational amplifier Amp1 and the output voltage Vo1 of the operational amplifier Amp2 are obtained from the same input, they become different values. In other words, since the resistance value ratio Rb1/Ra1 and the resistance value ratio Rb2/Ra2 are appropriately selected and designed, as shown in FIG. 3, it becomes possible to appropriately change and adjust the amounts of change in the output voltages Vo1 and Vo2 according to rise in the operation junction temperature Tj detected by the diode D. For example, in the present embodiment, the amount of change in the output voltage Vo1 of the operational amplifier Amp1 is set to be comparatively small, and the amount of change in the output voltage Vo2 of the operational amplifier Amp2 is set such that change becomes comparatively steep. Hereinafter, these amounts of change are also referred to as the temperature slopes.

In the present embodiment, for example, the output voltage Vo1 of the operational amplifier Amp1 is used as an output in the case where the temperature of the power semiconductor switching element, i.e. the operation junction temperature Tj of the power semiconductor switching element during an operation is comparatively low, and the output voltage Vo1 of the operational amplifier Amp2 is used as an output in the case where the operation junction temperature Tj is comparatively high.

Referring to FIG. 1 again, the output selection unit 3 is, for example, a multiplexer (hereinafter, referred to as the multiplexer 3 in order to facilitate understanding), and selectively outputs any one of the output voltages Vo1 and Vo2 received from the operational amplifiers Amp1 and Amp2 to the microcomputer or the like (not shown in the drawings). An example of the configuration of the multiplexer 3 is shown in FIG. 4.

Figure 4:
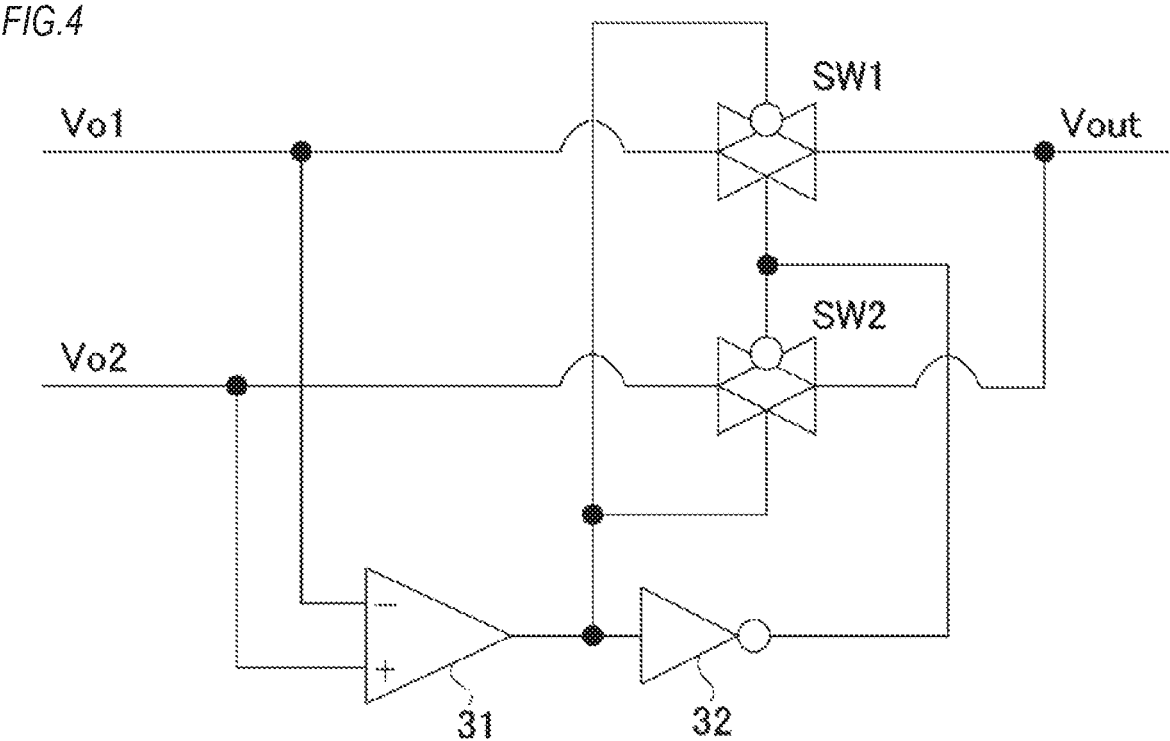
FIG. 4 is a view illustrating an example of the configuration of a multiplexer of FIG. 1.

As shown in FIG. 4, the multiplexer 3 is configured to include for example, a logic IC, and includes a comparator 31, a NOT gate (hereinafter, referred to as the inverter) 32, and semiconductor switches (hereinafter, referred to as the switches) SW1 and SW2.

One input terminal (for example, the negative Vin side) of the comparator 31 is connected to the output terminal of the operational amplifier Amp1, and receives the output voltage Vo1 of the operational amplifier Amp1. Also, the other input terminal (for example, the positive Vin side) of the comparator 31 is connected to the output terminal of the operational amplifier Amp2, and receives the output voltage Vo2 of the operational amplifier Amp2. The comparator 31 compares the magnitudes of the two received voltages Vo1 and Vo2, and outputs a binary signal having a high level (H level) or a low level (L level) and representing the magnitude relation. For example, in the case where the received output voltage Vo2 is larger than the received output voltage Vo1, the comparator 31 outputs an H-level signal. Meanwhile, in the case where the received output voltage Vo1 is larger than the received output voltage Vo2, the comparator 31 outputs an L-level signal. More details of the operation of the comparator 31 will be described below.

The input terminal of the inverter 32 is connected to the output terminal of the comparator 31, and the output terminal is connected to the switches SW1 and SW2. The inverter 32 inverts the output (the H-level or L-level signal) received from the comparator 31, and outputs the inverted signal to the switches SW1 and SW2.

Each of the switches SW1 and SW2 is composed of, for example, a CMOS switch which is configured by connecting an n-channel MOSFET and a p-channel MOSFET in parallel. For example, in order to make the switch SW1 be turned on in the case where the output voltage Vo1 is larger than the output voltage Vo2 and make the switch SW2 be turned on in the case where the output voltage Vo2 is larger than the output voltage Vo1, the gate of one MOSFET of the switch SW1 is connected to the output terminal of the comparator 31, and the gate of the other MOSFET is connected to the output terminal of the inverter 32. Similarly, the gate of one MOSFET of the switch SW2 is connected to the output terminal of the inverter 32, and the gate of the other MOSFET is connected to the output terminal of the comparator 31. Switching of the switches SW1 and SW2 between the ON state and the OFF state will be described below in detail.

(Operation)

Now, the operation of the above-described temperature detection device 1 will be described in detail with reference to FIGS. 1 to 4.

The voltage of the diode D which is a temperature sensor, i.e. the voltage signal Vf according to the operation junction temperature Tj of the power semiconductor switching element has a negative temperature coefficient, and is input to the inverting input terminals of the operational amplifiers Amp1 and Amp2 via the resistors Ra1 and Rat as shown in FIG. 1 and FIG. 2.

Each of the operational amplifiers Amp1 and Amp2 inverts and amplifies the received voltage signal. Therefore, the output voltages Vo1 and Vo2 of the operational amplifiers Amp1 and Amp2 become positive values by the inversion and the amplification. Also, as described above, since the resistance values are selected and set such that the resistance value ratio Rb1/Ra1 of the operational amplifier (Amp1) side and the resistance value ratio Rb2/Ra2 of the operational amplifier (Amp2) side become different values, the amounts of change in the output voltages Vo1 and Vo1 according to rise in the operation junction temperature Tj detected are different from each other as shown in FIG. 3, and have a magnitude relation in which the output voltage Vo1 is larger until a certain threshold and the output voltage Vo2 is larger after that threshold. As shown in FIG. 4, the output voltages Vo1 and Vo2 are input to the comparator 31 included in the multiplexer 3. Hereinafter, that threshold is also referred to as the appropriate temperature threshold.

The comparator 31 compares the magnitudes of the received output voltages Vo1 and Vo2. In the case where the output voltage Vo1 is larger than the output voltage Vo2, the comparator 31 outputs the L-level signal. This L-level signal is given to the gate of the one MOSFET of the switch SW1, and is also given to the gate of the other MOSFET of the switch SW2. Also, this L-level signal is input to the inverter 32.

The inverter 32 inverts the received L-level signal, and outputs the H-level signal. This H-level signal is given to the gate of the other MOSFET of the switch SW1 and the gate of the one MOSFET of the switch SW2.

In this case, to the gate of the p-channel MOSFET of the switch SW1, the L-level signal is given, and to the gate of the n-channel MOSFET, the H-level signal (having an uninvested logical value of 1) is given. Therefore, the switch SW1 is turned on. Meanwhile, to the gate of the p-channel MOSFET of the switch SW2, the H-level signal is given, and to the gate of the n-channel MOSFET, the L-level signal is given. Therefore, the switch SW2 is maintained in the OFF state. Therefore, the operational amplifier Amp1 and the microcomputer or the like (not shown in the drawings) are electrically connected, and the output voltage Vo1 corresponding to the case where the junction temperature Tj of the power semiconductor switching element is comparatively low is input to the microcomputer or the like.

Also, as shown in FIG. 3, the output voltage Vo1 and the output voltage Vo2 intersect with each other at a certain threshold as the operation junction temperature Tj rises, and thereafter, the output voltage Vo2 is larger than the output voltage Vo1. In this case, the comparator 31 included in the multiplexer 3 outputs the H-level signal. This H-level signal is given to the gate of the one MOSFET of the switch SW1, and is also given to the gate of the other MOSFET of the switch SW2. Also, this H-level signal is input to the inverter 32.

The inverter 32 inverts the received H-level signal, and outputs the L-level signal. This L-level signal is given to the gate of the other MOSFET of the switch SW1 and the gate of the one MOSFET of the switch SW2.

In this case, to the gate of the p-channel MOSFET of the switch SW1, the H-level signal is given, and to the gate of the n-channel MOSFET, the L-level signal is given. Therefore, the switch SW1 is maintained in the OFF state. Meanwhile, to the gate of the p-channel MOSFET of the switch SW2, the L-level signal is given, and to the gate of the n-channel MOSFET, the H-level signal is given. Therefore, the switch SW2 is turned on. Therefore, the operational amplifier Amp2 and the microcomputer or the like (not shown in the drawings) are electrically connected, and the output voltage Vo2 corresponding to the case where the operation junction temperature Tj of the power semiconductor switching element is comparatively high is input to the microcomputer or the like.

(Functions and Effects)

As described above, according to the temperature detection device 1 of the present invention, the voltage of the diode D which is a temperature sensor is inverted and amplified by the operational amplifiers Amp1 and Amp2 having the resistance value ratios selected such that the operational amplifiers have outputs different in the amount of change. Since the resistance value ratio Rb1/Ra1 of the operational amplifier (Amp1) side and the resistance value ratio Rb2/Ra2 of the operational amplifier Amp2 are appropriately selected, the output voltages Vo1 and Vo2 of the operational amplifiers Amp1 and Amp2 are different in the amount of change according to rise in the operation junction temperature Tj detected by the diode D. Therefore, the output voltage Vo1 and the output voltage Vo2 intersect with each other at a certain threshold. With reference to this temperature threshold, in the low-temperature range, the output voltage Vo1 of the operational amplifier Amp1 having a comparatively small amount of change (a comparatively gentle temperature slope) is input to the microcomputer or the like (not shown in the drawings) such that the continuity of the output voltage Vout at the temperature threshold is kept, and in the high-temperature range, the output voltage Vo2 of the operational amplifier Amp2 having a comparatively large amount of change (a comparatively steep temperature slope) is input to the microcomputer or the like.

Therefore, it becomes possible to increase the amount of change in the output voltage Vout of the temperature detection device 1 relative to the operation junction temperature Tj, and it is possible to achieve improvement of the accuracy of the output voltage Vout at temperatures in the high-temperature range. Further, it is possible to obtain appropriate temperature detection characteristic for protecting the power semiconductor switching element from overheating.

According to the temperature detectors device 1 of the present invention, since it is possible to achieve improvement of the accuracy of temperature detection for protecting the power semiconductor switching element from overheating beyond the limit based on the measurement accuracy in the case where the amount of change (temperature slope) in the output voltage Vout of the temperature detection device 1 according to rise in the operation junction temperature Tj is constant, it is possible to expect the effect of increasing the margin of the operation junction temperature Tj of a power semiconductor switching element in a power conversion device.

For example, in the temperature detection device of the related art, in the case of measurement accuracy in which the amount of change in the output voltage relative to the temperature is 26 mVPC, and the accuracy ΔVout of the output voltage is ±0.014 V, the accuracy ΔTj of detection temperature is ±4° C. In this case, even though an optimal overheating prevention operation point is set, in the case where the rated value of the operation junction temperature Tj of the power semiconductor switching element is, for example, 150° C., the upper limit of the operation junction temperature becomes 142° C. (=150° C.−ΔTj×2). Therefore, in the case where the upper limit of the temperature of a printed board is 100° C., the margin ΔT of the operation junction temperature Tj becomes 42° C.

Meanwhile, in the temperature detection device 1 of the present invention, for example, in the case of selecting 52 mV/° C. as the amount of change in the output voltage Vout relative to the operation junction temperature Tj in the high-temperature range, the accuracy ΔTj of detection temperature decreases to ±2° C. by half. Therefore, it is possible to increase the upper limit of the operation junction temperature to 146° C. In this case, it is possible to increase the margin ΔT of the operation junction temperature to ±46° C. The margin of the operation junction temperature becomes larger than that in the case of using the temperature detection device of the related art by 10%. This provides a possibility that it is possible to increase the output power capacity of a power conversion device by 10%.

Also, it is possible to flexibly shift the temperature threshold at which the amounts of change in the output voltages Vo1 and Vo2 of the operational amplifiers Amp1 and Amp2 connected to the diode D (a temperature sensor) according to rise in the operation junction temperature Tj, i.e. the output voltages Vo1 and Vo2 according to the operation junction temperature Tj intersect with each other, to the low-temperature side or the high-temperature side with respect to the operation junction temperature Tj by appropriately selecting the resistance value ratio of the feedback resistor and input resistor of each of the operational amplifiers. Therefore, it becomes possible to appropriately set a low-temperature range and a high-temperature range according to the actual purpose. Therefore, it is possible to more appropriately protect the power semiconductor switching element from overheating.

This effect can be achieved by the temperature detection device capable of further improving the accuracy of detection of the temperature of an object and more flexibly performing temperature detection, and a power conversion device provided with the same.

Second Embodiment

In the first embodiment, with reference to a certain threshold, in the temperature range, the low-temperature range and the high-temperature range are simply set. However, for example, in the case where the load of a three-phase AC inverter in which a semiconductor switching element which is a temperature detection object is used is a motor for the compressor of an air conditioner, the time when the junction temperature of the semiconductor switching element is low is likely to be immediately after the air conditioner is started. Therefore, at that time, the temperature of the lubricant of the motor is comparatively low, so high load may be applied to the motor. In terms of the life of the motor, it is desirable to prevent high load from being applied to the motor, as much as possible. In this case, if the first embodiment is simply applied, sometimes, it may be impossible to prevent high load from being applied to the motor. For this reason, in this case, it is desirable to divide the temperature range into more sections by changing the number of temperature thresholds at which the outputs of the operational amplifiers intersect with each other, such that temperature detection is more flexibly performed depending on those sections.

Figure 6:
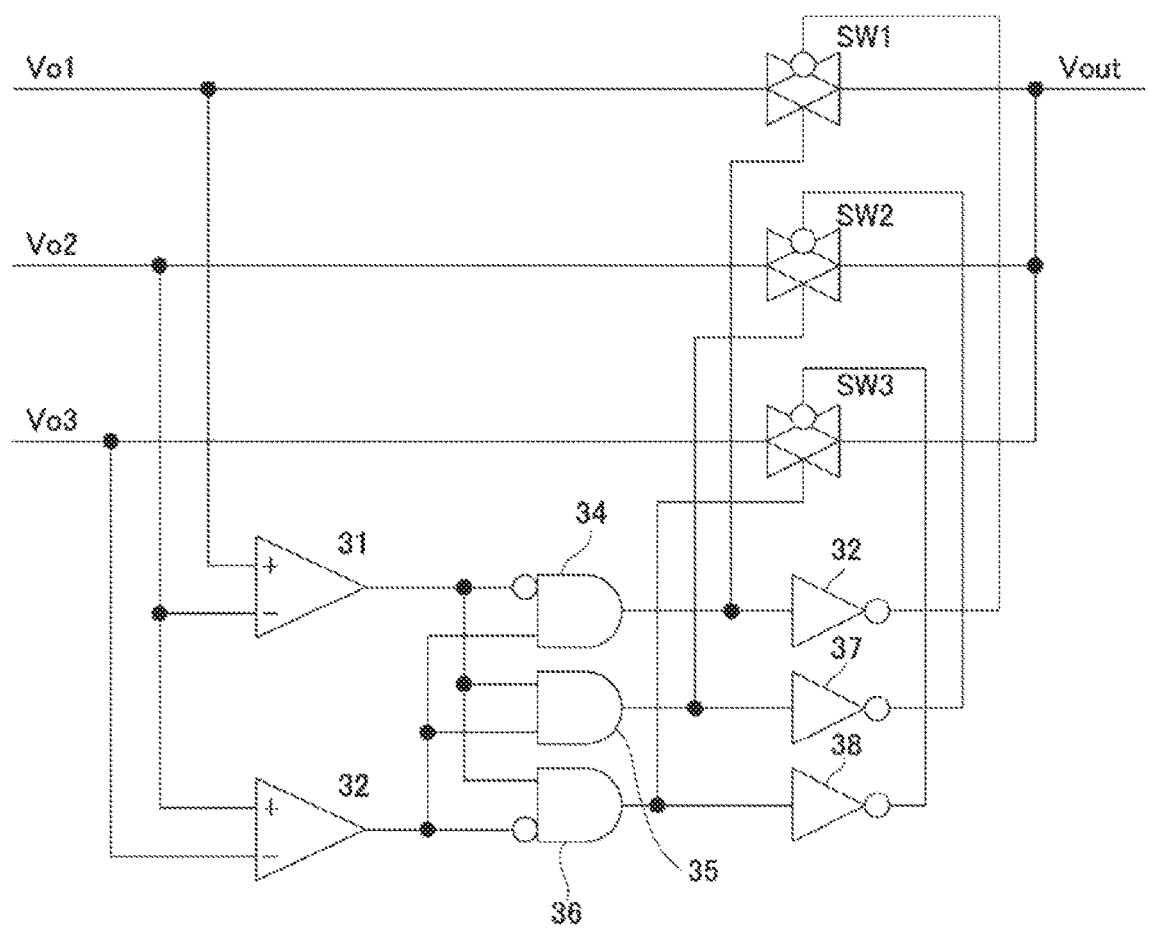
FIG. 6 is a view illustrating an example of the configuration of a multiplexer of FIG. 5.
Figure 7:
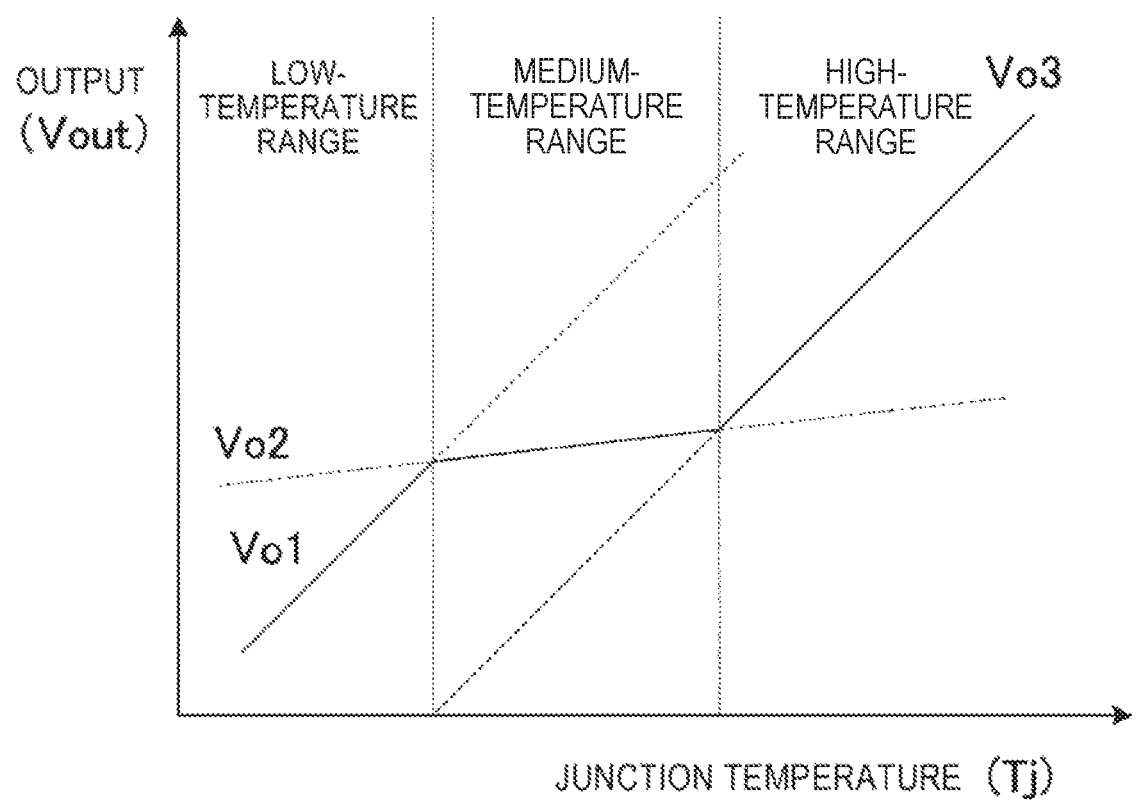
FIG. 7 is a graph illustrating the output characteristic of the temperature detection device shown in FIG. 5.

Hereinafter, a second embodiment of the present invention will be described in detail with reference to FIGS. 5 to 7. Also, components identical or similar to those of the first embodiment are denoted by the same reference symbols; however, a detailed description thereof will not be made.

Figure 5:
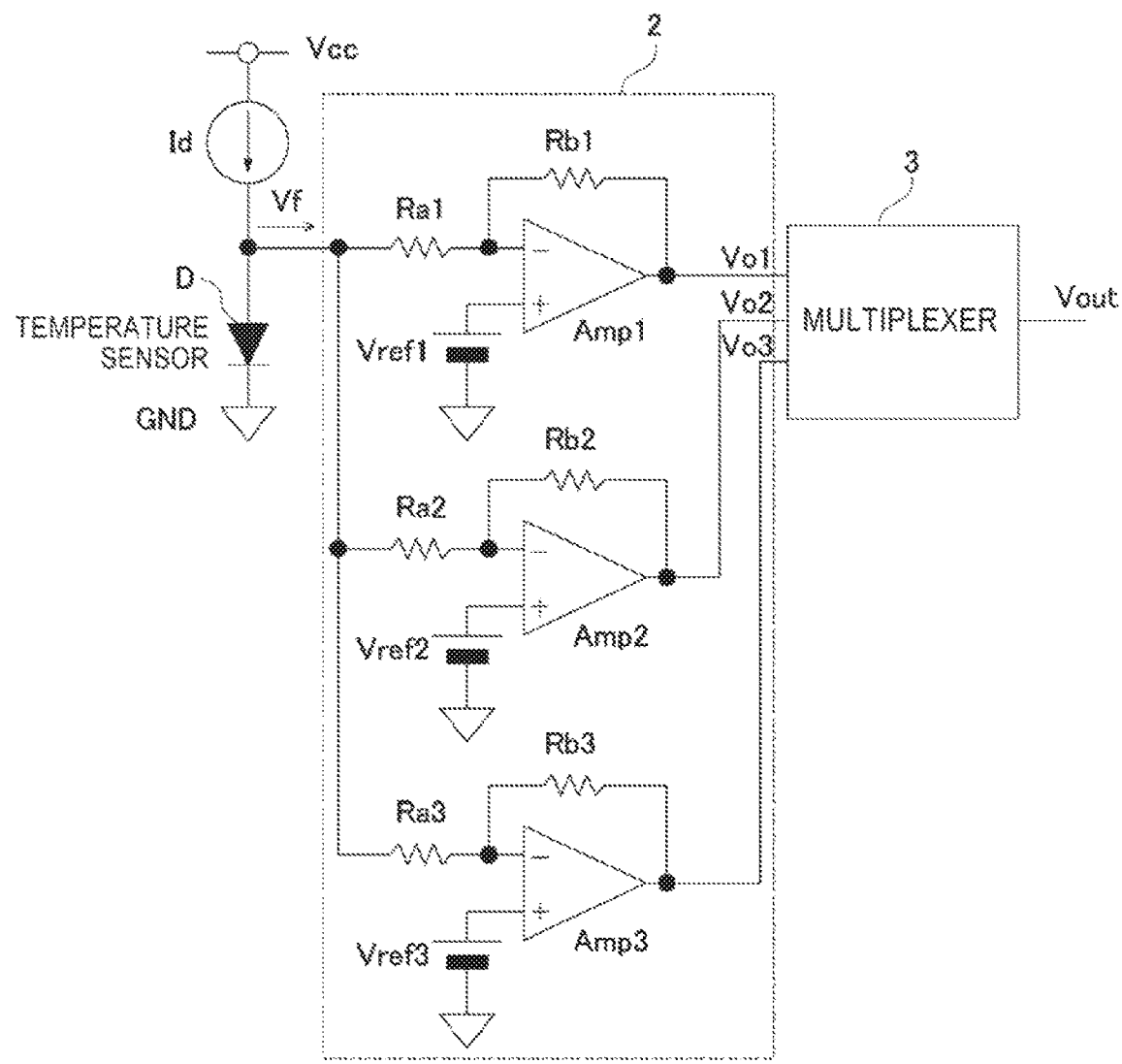
FIG. 5 is a circuit diagram illustrating an example of the configuration of a temperature detection device according to a second embodiment of the present invention.

As shown in FIG. 5, in the second embodiment, for example, the output calculation unit 2 further includes an operational amplifier Amp3, in addition to the operational amplifiers Amp1 and Amp2.

Similarly to the operational amplifiers Amp1 and Amp2, the non-inverting input terminal of the operational amplifier Amp3 is connected to a reference voltage source Vref3, and the inverting input terminal is connected to the diode D and the constant-current source Id via a resistor Ra3. Also, the output terminal and inverting input terminal of the operational amplifier Amp3 form a closed loop, i.e. a negative feedback circuit via a resistor Rb3. As described above, the voltage signal Vf which is output from the diode D has a voltage value according to the operation junction temperature Tj of the power semiconductor switching element, and has a negative temperature coefficient. This voltage signal Vf is input to the operational amplifier Amp3, and is inverted and amplified. An output voltage Vo3 obtained by the inversion and the amplification is input to the output selection unit 3 (multiplexer 3), similarly to the output voltages Vo1 and Vo2 of the operational amplifiers Amp1 and Amp2. Here, when the resistance values of the resistors Ra3 and Rb3 and the voltage values of the reference voltage source Vref3 and the voltage signal Vf are represented by the same reference symbols Ra3, Rb3, Vref3, and Rf, the output voltage Vo3 of the operational amplifier Amp3 also can be expressed as Vo3=Vref3 Rb3/Ra3×(Vref3−Vf). Also, a reference voltage source Vref3 may have, for example, the same electric potential as that of the reference voltage sources Vref1 and Vref2.

Here, when the resistance values of the individual resistors shown in FIG. 5, i.e. the resistors Ra1, Ra2, Rb1, Rb2, Ra3, and Rb3 are represented by the same reference symbols Ra1, Ra2, Rb1, Rb2, Ra3, and Rb3, the resistance values are set and selected such that the ratio Rb1/Ra1 of the resistance values of the resistors Rb1 and Ra1 disposed on the operational amplifier (Amp1) side, the ratio Rb2/Ra2 of the resistance values of the resistors Rb2 and Ra2 disposed on the operational amplifier (Amp2) side, and the ratio Rb3/Ra3 of the resistance values of the resistors Rb3 and Ra3 disposed on the operational amplifier (Amp3) side become different values. In other words, since the resistance value ratio Rb1/Ra1, the resistance value ratio Rb2/Ra2, and the resistance value ratio Rb3/Ra3 are appropriately selected and designed, as shown in FIG. 6, it becomes possible to appropriately change and adjust the amounts of change in the output voltages Vo1, Vo2, and Vo3 according to rise in the operation junction temperature Tj detected by the diode D. For example, in the present embodiment, the range of the operation junction temperature Tj is divided into a low-temperature range, a medium-temperature range, and a high-temperature range with reference to a plurality of temperature thresholds at which the output voltages intersect.

The high-temperature range is, for example, a temperature range which is set for protecting the power semiconductor switching element from overheating, and in the present embodiment, the resistance value ratio of the feedback resistor and input resistor of each of the operational amplifiers is appropriately set and selected such that the output voltage Vo1 becomes larger than the output voltage Vo2 and the output voltage Vo3 becomes larger than the output voltage Vo2.

Also, the low-temperature range is, for example, a temperature range which is set for preventing high load from being applied to the motor for the compressor during low-temperature start, and in the present embodiment, the individual resistance value ratios are appropriately set and selected such that the output voltage Vo2 becomes larger than the output voltage Vo1 and the output voltage Vo2 becomes the output voltage Vo3. Further, with respect to temperature detection in the low-temperature range, in the corresponding information may be notified to the microcomputer or the like which is the connection destination of the multiplexer 3, from an external interface or the like (not shown in the drawings), in advance.

Furthermore, the medium-temperature range is, for example, a range for making transition from the operation in the low-temperature range to the operation in the high-temperature range smooth, and is a range requiring the accuracy of detection of the operation junction temperature of the power semiconductor switching element less than the high-temperature range does. In other words, in the present embodiment, the amount of change in the output voltage Vout which is output from the multiplexer 3 in the high-temperature range requiring the accuracy of detection more than the medium-temperature range does is set to be larger, whereby the amount of change in the output voltage Vout according to change in the temperature is increased and improvement of the detection accuracy in the high-temperature range is achieved. In the present embodiment, each of the resistance value ratios is appropriately set and selected such that the output voltage Vo1 becomes larger than the output voltage Vo1 and the output voltage Vo2 becomes larger than the output voltage Vo3.

Now, the configuration of the multiplexer 3 according to the present embodiment will be described. The multiplexer 3 shown in FIG. 5 further includes, for example, a comparator 33, AND gates 34 to 36, inverters 37 and 38, and a switch SW3, in addition to the comparator 31, the switch SW1, the switch SW2, and the inverter 32, as shown in FIG. 6.

Unlike in the first embodiment, the one input terminal (for example, the negative Vin side) of the comparator 31 is connected to the output terminal of the operational amplifier Amp2, and receives the output voltage Vo2 of the operational amplifier Amp2. Further, the other input terminal (for example, the positive Vin side) of the comparator 31 is connected to the output terminal of the operational amplifier Amp1, and receives the output voltage Vo1 of the operational amplifier Amp1. Unlike in the first embodiment, the comparator 31 outputs the H-level signal in the case where the output voltage Vo1 is larger than the output voltage Vo2, and outputs the L-level sianal in the case where the output voltage Vo2 is larger than the output voltage Vo1.

Similarly, one input terminal (for example, the negative Vin side) of the comparator 33 is connected to the output terminal of the operational amplifier Amp3, and receives the output voltage Vo3 of the operational amplifier Amp3. Further, the other input terminal of the comparator 33 is connected to the output terminal of the operational amplifier Amp2, and receives the output voltage Vo2 of the operational amplifier Amp2. For example, the comparator 33 outputs an H-level signal in the case where the output voltage Vo2 is larger than the output voltage Vo3. Also, the comparator 33 outputs an L-level signal in the case where the output voltage Vo3 is larger than the output voltage Vo2. More details of the operation of the comparator 33 will be described below.

One input terminal of the AND gate 34 which is an active-LOW terminal is connected to the output terminal of the comparator 31, and the other input terminal is connected to the output terminal of the comparator 33. Further, one input terminal of the AND gate 35 is connected to the output terminal of the comparator 31, and the other input terminal is connected to the output terminal of the comparator 33. Furthermore, one input terminal of the AND gate 36 is connected to the output terminal of the comparator 31, and the other input terminal is connected to the output terminal of the comparator 33.

The input terminal of the inverter 32 is connected to the output terminal of the AND gate 34, and the output terminal thereof is connected to the gate of the one MOSFET of the switch SW1. Further, the input terminal of the inverter 37 is connected to the output terminal of the AND gate 35, and the output terminal thereof is connected to the gate of the one MOSFET of the switch SW2. Furthermore, the input terminal of the inverter 38 is connected to the output terminal of the AND gate 36, and the output terminal thereof is connected to the gate of the one MOSFET of the switch SW3.

The switch SW1 is connected to the output terminal of the operational amplifier Amp1, and the gate of the other MOSFET thereof is connected to the output terminal of the AND gate 34. Further, the switch SW2 is connected to the output terminal of the operational amplifier Amp2, and the gate of the other MOSFET thereof is connected to the output terminal of the AND gate 35. Furthermore, the switch SW3 is connected to the output terminal of the operational amplifier Amp3, and the gate of the other MOSFET thereof is connected to the output terminal of the AND gate 36.

(Operation)

Now, the operation of the above-described temperature detection device 1 according to the present embodiment will be described in detail with reference to FIGS. 5 to 7. Also, in the following description, in order to facilitate understanding, with respect to rise in the operation junction temperature Tj, the low-temperature range, the medium-temperature range, and the high-temperature range will be sequentially described.

First, in the low-temperature range, the individual resistance value ratios in the output calculation unit 2 which is disposed at the previous stage are set and selected such that the output voltage Vo2 becomes larger than the output voltage Vo1. Therefore, the comparator 31 of the multiplexer 3 shown in FIG. 6 outputs the L-level signal. This L-level signal is input to the one input terminal of the AND gate 34 which is an active-LOW terminal. Further, in the low-temperature range, the individual resistance value ratios in the output calculation unit 2 are set and selected such that the output voltage Vo2 becomes larger than the output voltage Vo3 at the previous stage. Therefore, the comparator 33 outputs the H-level signal. This H-level signal is input to the other input terminal of the AND gate 34.

The AND gate 34 outputs an H-level signal on the basis of the two received signals. This H-level signal is given to the gate of the other MOSFET of the switch SW1, for example, the n-channel MOSFET, and is also input to the inverter 32. The inverter 32 inverts the received H-level signal and gives the L-level signal to the gate of the one MOSFET of the switch SW1, for example, the p-channel MOSFET. Therefore, the switch SW1 is turned on, whereby the operational amplifier Amp1 and the microcomputer or the like (not shown in the drawings) are electrically connected, and the output voltage Vo1 is input to the microcomputer or the like.

In the medium-temperature range, the individual resistance value ratios of the previous stage are set and selected such that the output voltage Vo1 becomes larger than the output voltage Vo2. Therefore, the comparator 31 outputs the H-level signal. This H-level signal is input to the one input terminal of the AND gate 35. Further, in the medium-temperature range, the individual resistance value ratios is set and selected such that the output voltage Vo2 becomes larger than the output voltage Vo3 at the previous stage. Therefore, the comparator 33 outputs the H-level signal. This H-level signal is input to the other input terminal of the AND gate 35.

The AND gate 35 outputs an H-level signal on the basis of the two received signals. This H-level signal is given to the gate of the n-channel MOSFET of the switch SW2, and is also input to the inverter 37. The inverter 37 inverts the received H-level signal and gives the L-level signal to the gate of the p-channel MOSFET of the switch SW2. Therefore, the switch SW2 is turned on, whereby the operational amplifier Amp2 and the microcomputer or the like (not shown in the drawings) are electrically connected, and the output voltage Vo2 is input to the microcomputer or the like.

In the high-temperature range, the individual resistance value ratios are set and selected at the previous stage such that the output voltage Vo1 becomes larger than the output voltage Vo2. Therefore, the comparator 31 outputs the H-level signal. This H-level signal is input to the one input terminal of the AND gate 36. Further, in the high-temperature range, the individual resistance value ratios are set and selected at the previous stage such that the output voltage Vo3 becomes larger than the output voltage Vo2. Therefore, the comparator 33 outputs the L-level signal. This L-level signal is input to the other input terminal of the AND gate 36 which is an active-LOW terminal.

The AND gate 36 outputs an H-level signal on the basis of the two received signals. This H-level signal is given to the gate of the n-channel MOSFET of the switch SW3, and is also input to the inverter 38. The inverter 38 inverts the received H-level signal and gives the L-level signal to the gate of the p-channel MOSFET of the switch SW3. Therefore, the switch SW3 is turned on, whereby the operational amplifier Amp3 and the microcomputer or the like (not shown in the drawings) are electrically connected, and the output voltage Vo3 is input to the microcomputer or the like.

(Functions and Effects)

As described above, according to the present embodiment, in the temperature detection device 1, with reference to the plurality of temperature thresholds at which the output voltages of the operational amplifiers intersect, the detection temperature range is divided into the low-temperature range, the medium-temperature range, and the high-temperature range such that the continuity of the output voltage Vout at each temperature threshold is secured. Since the amount of change in the output voltage Vout in the low-temperature range is appropriately set, as compared to the case where the amount of change (temperature slope) in the output voltage is simply linear, it becomes possible to suppress high load during low-temperature start from being applied to, for example, a motor for a compressor while improving the accuracy of temperature detection.

Also, since the amount of change in the output voltage Vout in the high-temperature range is appropriately set, as compared to the case where change in the output voltage is simply linear, it becomes possible to increase the amount of change (temperature slope) relative to the temperature. Therefore, it is possible to obtain an optimal temperature detection characteristic for protecting the semiconductor switching element from overheating while improving the accuracy of detection of the operation junction temperature Tj in the high-temperature range.

Since the resistance value ratios Rb1/Ra1, Rh2/Ra2, and Rb3/Ra3 of the feedback resistors and input resistors of the operational amplifiers are appropriately set and selected as described above, those amounts of change can be optimized depending not only on the target temperature ranges but also on the purposes.

Figure 8:
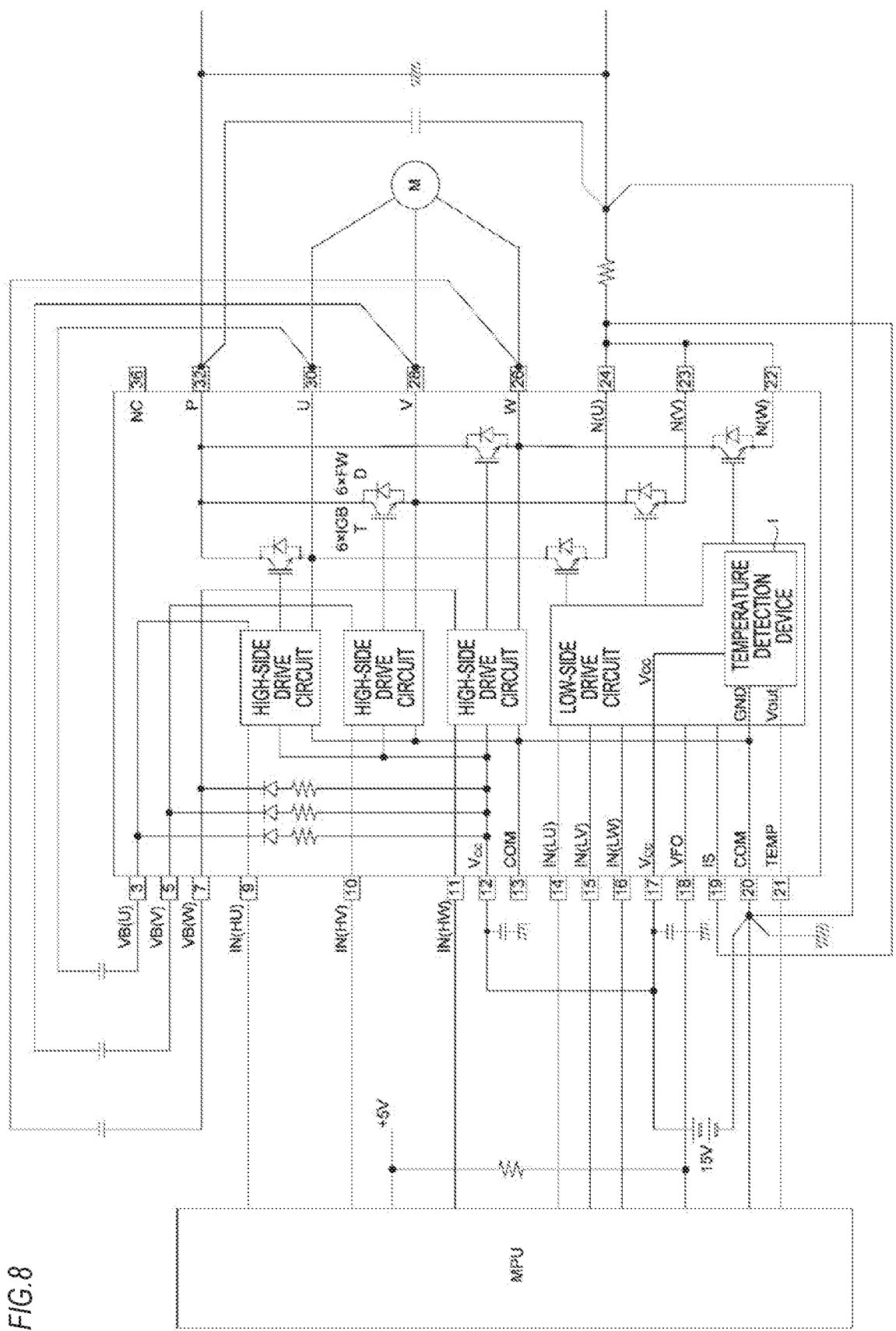
FIG. 8 is a view illustrating an example of the configuration of a power conversion device provided with a temperature detection device of the present invention.
Figure 9:
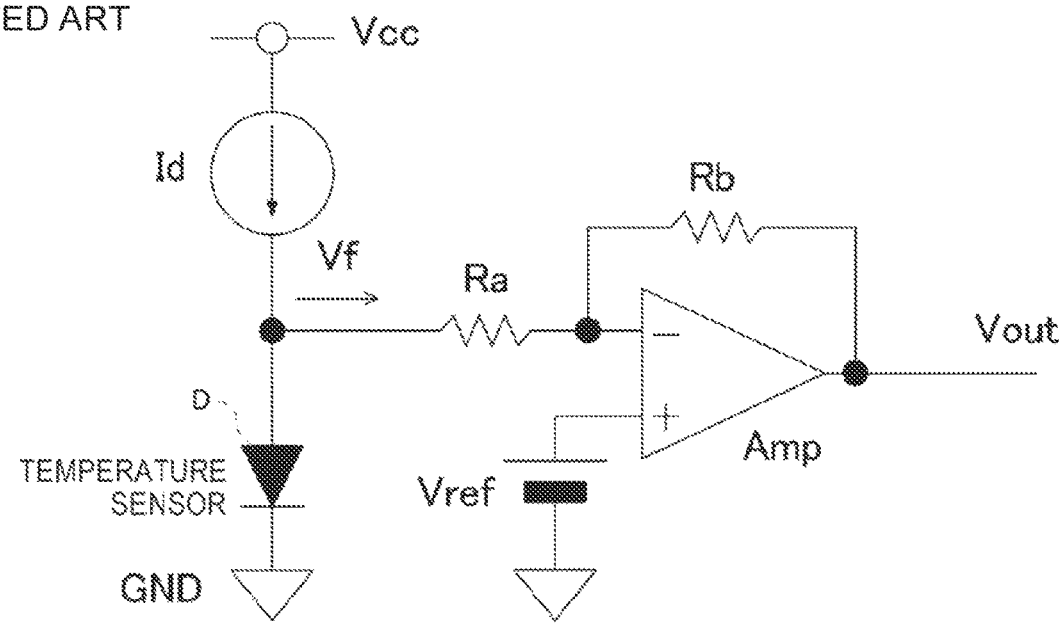
FIG. 9 is a circuit diagram illustrating an example of the configuration of a temperature detection device of the related art.
Figure 10:
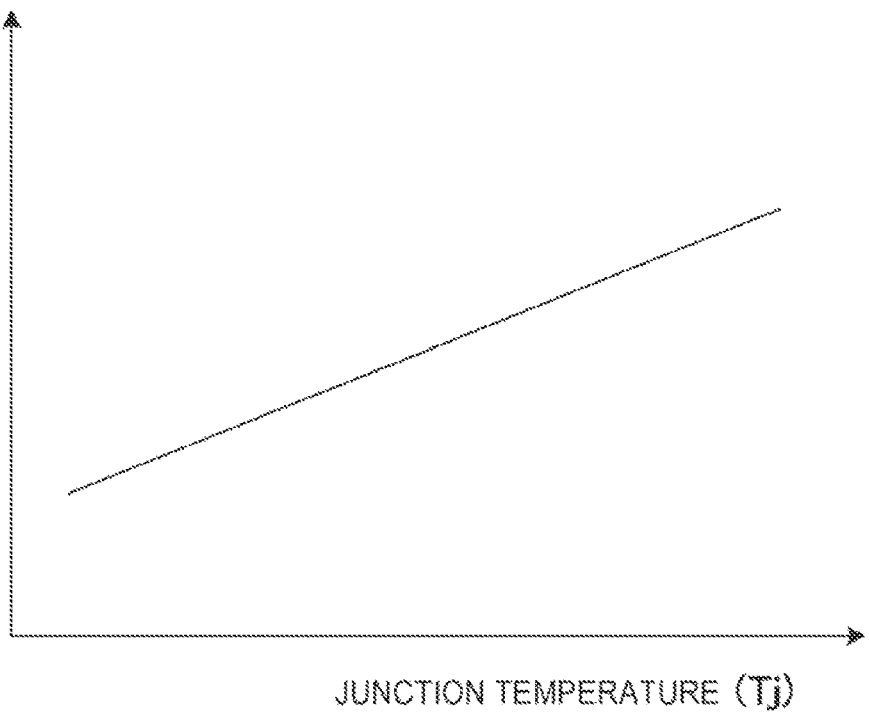
FIG. 10 is a graph illustrating the output characteristic of the temperature detection device shown in FIG. 9.

The temperature detection devices 1 of the first and second embodiments described above can be applied to, for example, a three-phase AC inverter module shown in FIG. 8. In this example, the temperature detection device 1 is provided in a low-side drive circuit of the three-phase AC inverter module, and detects the operation junction temperature of a semiconductor switching element connected to the low-side drive circuit. Also, the temperature detection device informs the detected operation junction temperature to an external MPU (a microcomputer or the like). The MPU gives an instruction according to the operation junction temperature to the low-side drive circuit. The low-side drive circuit drives the power semiconductor switching element according to the given instruction.

The present invention is not limited to the above-described embodiments, and a variety of applications, modifications, and replacements can be made without departing from the technical scope of the present invention. Such modes are included in the technical scope of the present invention, and are included in the technical scope disclosed in the appended claims and the equivalent scope thereof.

For example, in the above-described embodiments, as the number of operational amplifiers is changed, with reference to certain thresholds, a plurality of temperature ranges is set; however, the present invention is not limited to this configuration. For example, a single operational amplifier may be used, and the resistance value of the negative feedback side and the reference voltage of the non-inverting input terminal side may be variable, such that it is possible to set a plurality of temperature ranges with reference to a certain threshold.

Also, in the above-described embodiments, the case where the temperature slope in the high-temperature range is larger than that in the low-temperature range with reference to a certain temperature threshold has been described as an example. However, the present invention is not limited to that case. Depending on the purpose of the temperature detection device 1, it may be desirable that the temperature slope in the low-temperature range should be larger than that in the high-temperature range. In this case, it is possible to make the temperature slope in the low-temperature range larger than that in the high-temperature range, for example, by appropriately setting and selecting the resistance value ratios of the operational amplifiers as described as an example in the embodiments, or appropriately changing the connection relation of the peripheral components of each comparator and so on in the multiplexer 3 to which the outputs of the operational amplifiers are input.

The invention claimed is:

1. A temperature detection device, comprising:
an output calculation unit configured to receive a temperature signal from a temperature sensor, the output calculation unit including a plurality of operational amplifiers to calculate outputs of an electric signal corresponding to the temperature signal, wherein resistance value ratios of feedback resistors and input resistors of the respective operational amplifiers are set to different values; and
an output selection unit configured to output the electrical signal corresponding to the temperature signal by selecting one of the outputs calculated by the output calculation unit, wherein, a temperature slope which is an amount of change in an output of the electric signal relative to an amount of change in the temperature signal is changed at a predetermined temperature threshold.

2. The temperature detection device according to claim 1, wherein:
the temperature slope is changed at a plurality of predetermined temperature thresholds.

3. The temperature detection device according to claim 1, wherein:
in a temperature range which the temperature of an object can take, a high-temperature range higher than the predetermined temperature threshold and a low-temperature range lower than the predetermined temperature threshold are set with reference to the predetermined temperature threshold, and the temperature slope in the high-temperature range is larger than that in the low-temperature range.

4. The temperature detection device according to claim 1, wherein:
the temperature sensor includes a diode formed in an integrated circuit to drive a power semiconductor switching element which is used for power conversion.

5. The temperature detection device according to claim 1, wherein:
the temperature sensor includes a thermistor to detect the temperature of a power semiconductor switching element which is used for power conversion.

6. The temperature detection device according to claim 1, wherein:
in a temperature range which the temperature of an object can take, a high-temperature range higher than the predetermined temperature threshold and a low-temperature range lower than the predetermined temperature threshold are set with reference to the predetermined temperature threshold, and the temperature slope in the low-temperature range is larger than that in the high-temperature range.

7. The temperature detection device according to claim 1, wherein:
the temperature sensor includes a diode formed in a chip of a power semiconductor switching element which is used for power conversion.

8. The temperature detection device according to claim 1, wherein:
the output calculation unit is configured to calculate the outputs of the electric signal corresponding to the temperature signal by using different temperature slopes; and
the output selection unit is configured to output the electric signal by selecting one of the outputs calculated by the output calculation unit based on the predetermined temperature threshold.

9. The temperature detection device according to claim 8, wherein:
the output selection unit includes a multiplexer to which outputs of the plurality of operational amplifiers are input and which selects an output of one of the operational amplifiers based on the predetermined temperature threshold.

10. The temperature detection device according to claim 9, wherein:
the multiplexer has a point at which outputs of the plurality of operational amplifiers intersect as the predetermined temperature threshold.

11. A power conversion device comprising:
a power semiconductor switching element that is used for power conversion; and
the temperature detection device according to claim 1 that detects an operation junction temperature of the power semiconductor switching element.

12. The power conversion device according to claim 11, wherein:
the temperature detection device is configured to change the temperature slope, according to an operation state of a load which is driven, and
in a temperature range which the operation junction temperature of the power semiconductor switching element can take, a high-temperature range higher than the predetermined temperature threshold and a low-temperature range lower than the predetermined temperature threshold are set with reference to the predetermined temperature threshold, and the temperature slope in the high-temperature range is larger than that in the low-temperature range.

13. The power conversion device according to claim 12, wherein the load is a motor.

14. The power conversion device according to claim 11, wherein:
the temperature detection device is configured to change the temperature slope, according to an operation state of a load which is driven, and
in a temperature range which the operation junction temperature of the power semiconductor switching element can take, a high-temperature range higher than the predetermined temperature threshold and a low-temperature range lower than the predetermined temperature threshold are set with reference to the predetermined temperature threshold, and the temperature slope in the low-temperature range is larger than that in the high-temperature range.

15. The power conversion device according to claim 14, wherein the load is a motor.

16. A temperature detection device, comprising:
an output calculation unit configured to receive a temperature signal from a temperature sensor; and
an output selection unit configured to output an electrical signal corresponding to the temperature signal, wherein a temperature slope which is an amount of change in an output of the electric signal relative to an amount of change in the temperature signal is changed at a predetermined temperature threshold,
wherein
in a temperature range which the temperature of an object can take, a high-temperature range higher than the predetermined temperature threshold and a low-temperature range lower than the predetermined temperature threshold are set with reference to the predetermined temperature threshold, and the temperature slope in the low-temperature range is larger than that in the high-temperature range.

17. A power conversion device comprising:
a power semiconductor switching element that is used for power conversion; and
the temperature detection device according to claim 16 that detects an operation junction temperature of the power semiconductor switching element.

18. A temperature detection device, comprising:
an output calculation unit configured to receive a temperature signal from a temperature sensor, the temperature sensor including
a diode formed in a chip of a power semiconductor switching element which is used for power conversion, or
a diode formed in an integrated circuit to drive a power semiconductor switching element which is used for power conversion, or
a thermistor to detect a temperature of a power semiconductor switching element which is used for power conversion; and
an output selection unit configured to output an electrical signal corresponding to the temperature signal, wherein a temperature slope which is an amount of change in an output of the electric signal relative to an amount of change in the temperature signal is changed at a predetermined temperature threshold.

19. A power conversion device comprising:
the temperature detection device according to claim 18, wherein
when the temperature sensor includes the diode formed in the chip of the power semiconductor switching element, the power conversion device comprises the power semiconductor switching element having the chip,
when the temperature sensor includes the diode formed in the integrated circuit to drive the power semiconductor switching element, the power conversion device comprises the power semiconductor switching element to be driven by the diode formed in the integrated circuit, and
when the temperature sensor includes the thermistor to detect the temperature of the power semiconductor switching element, the power conversion device comprises the power semiconductor switching element, the temperature of which is detected by the thermistor.

* * * * *